US007986304B2

(12) United States Patent
Grunberger

(10) Patent No.: US 7,986,304 B2
(45) Date of Patent: Jul. 26, 2011

(54) SYSTEM, DEVICE, AND METHOD FOR EXTENDING A STROKE OF A COMPUTER POINTING DEVICE

(76) Inventor: Aaron Grunberger, Brooklyn, NY (US)

( * ) Notice: Subject to any disclaimer, the term of this patent is extended or adjusted under 35 U.S.C. 154(b) by 0 days.

(21) Appl. No.: 12/873,142

(22) Filed: Aug. 31, 2010

(65) Prior Publication Data
US 2010/0321297 A1 Dec. 23, 2010

Related U.S. Application Data

(63) Continuation of application No. 11/671,573, filed on Feb. 6, 2007, now Pat. No. 7,808,483.

(51) Int. Cl.
G09G 5/00 (2006.01)
G06F 3/033 (2006.01)
(52) U.S. Cl. ......... 345/163; 345/156; 345/159; 345/157
(58) Field of Classification Search .................. None
See application file for complete search history.

(56) References Cited

U.S. PATENT DOCUMENTS

| 6,011,541 | A | * | 1/2000 | Klein | 345/156 |
| 6,069,594 | A | * | 5/2000 | Barnes et al. | 345/7 |
| 6,115,029 | A | * | 9/2000 | Jaaskelainen et al. | 345/159 |
| 6,232,891 | B1 | * | 5/2001 | Rosenberg | 341/20 |
| 6,281,882 | B1 | * | 8/2001 | Gordon et al. | 345/166 |
| 7,035,085 | B2 | * | 4/2006 | Lee | 361/624 |
| 2002/0135563 | A1 | * | 9/2002 | Canakapalli | 345/163 |
| 2002/0171625 | A1 | * | 11/2002 | Rothchild | 345/156 |
| 2003/0112221 | A1 | * | 6/2003 | Kuan | 345/157 |
| 2004/0080488 | A1 | * | 4/2004 | Lim et al. | 345/156 |
| 2007/0268250 | A1 | * | 11/2007 | Min | 345/158 |

* cited by examiner

Primary Examiner — Bipin Shalwala
Assistant Examiner — Daniel Bedell

(57) ABSTRACT

With respect to a system, device, and method for moving a graphical object, a computer system may include a display device, a processor configured to control movement of a graphical object in the display device, and an input device that includes a sensor for sensing movement of the input device and generating a first signal indicating the sensed movement and an input element for generating a second signal when operated. The input device may be configured to transmit to the processor at least the first signal for instructing the processor to move the graphical object in a direction corresponding to a direction of the movement indicated by the first signal. In response to the generation of the second signal, either responsiveness to the first signal by the processor may be inhibited or correspondence of movement of the graphical object to the movement indicated by the first signal may be reversed.

19 Claims, 7 Drawing Sheets

SYSTEM, DEVICE, AND METHOD FOR EXTENDING A STROKE OF A COMPUTER POINTING DEVICE

CROSS-REFERENCE TO RELATED APPLICATIONS

This application is a continuation application of, and claims priority under 35 U.S.C. §120 to, U.S. patent application Ser. No. 11/671,573, filed Feb. 6, 2007, and issued on Oct. 5, 2010 as U.S. Pat. No. 7,808,483, the entire content of which is hereby incorporated by reference in its entirety.

FIELD OF THE INVENTION

The present invention relates to a system, device, and method for extending a practical stroke of operation of a pointing device, e.g., a computer mouse, by which to manipulate an object, e.g., on a graphical user interface (GUI).

BACKGROUND INFORMATION

Operation of a pointing device to correspondingly cause a graphical pointer, cursor, or other object presented on a display, e.g., a computer display, may require shifting the device's position. For example, to shift the graphical object up in the display, a user may move the device towards the device's front end; to shift the graphical object down in the display, the user may move the device towards the device's back end; to shift the graphical object to the right in the display, the user may move the device towards the device's right end; and to shift the graphical object to the left in the display, the user may move the device towards the device's left end. Similarly, to shift the object diagonally or in any other direction, the user may move the device in a corresponding direction.

SUMMARY

It often occurs that the user desires to shift the graphical object in the display by an amount that requires corresponding movement of the device by an amount that is greater than that with which the user is comfortable. For example, the amount of required movement may be so great as to require extending the device past an outer edge of a pad on which the device lies, e.g., a mouse pad, or so great as to require more than full extension of the user's arm, e.g., requiring the user to shift the user's upper body. Some users may wish to rotate their wrists or merely shift their fingers, without more extended movement, for causing movement of the graphical object.

To cause such extended movement of the device, the user may lift the device from a surface upon which the device rests during device movement detectable by a processor for correspondingly shifting the graphical object; while in the lifted position, move the device in a direction opposite from the direction that corresponds to the desired object shift; replace the device on the surface; and continue to shift the device in the direction that corresponds to the desired object shift. However, this procedure is extremely bothersome. Furthermore, when replacing the device on the surface, the user may inadvertently move the device in an undesired manner.

Embodiments of the present invention provide a system, method, and device that provides for extended movement of a device for corresponding extended shift of a graphically displayed object without requiring movement of the device past an outer edge of a pad on which the device lies, without requiring movement of the user's upper body or movement beyond full extension of the user's arm or wrist, and without requiring the user to lift the device from the surface upon which it lies.

According to an example embodiment of the present invention, a computer input device may include a sensor configured to sense movement of the device and generate a first signal indicating the sensed movement, and an input element configured to generate a second signal when operated. The computer input device may be adapted for transmitting to a processor at least the first signal for instructing the processor to move a graphical object in a direction corresponding to a direction of the movement indicated by the first signal. In response to the generation of the second signal, (a) responsiveness to the first signal by the processor may be inhibited or (b) correspondence of movement of the graphical object to the movement indicated by the first signal may be reversed.

In one example embodiment of the computer input device, the computer input device may further include a memory device configured to store a status flag, and a communication element configured to transmit signals generated by the computer input device to the processor. The computer input device may be configured so that, in response to the generation of the second signal, the computer input device changes a status indicated by the status flag between at least a first status and a second status. The communication element may be configured to transmit the first signal to the processor conditional upon the status flag indicating the first status.

In one example embodiment of the computer input device, the communication element may be configured to transmit to the processor, conditional upon the status flag indicating the second status, a third signal in response to the generation of the first signal for instructing the processor to move the graphical object in a direction corresponding to a reverse direction of the movement indicated by the first signal.

In one example embodiment of the computer input device, the computer input device may be configured to toggle the status indicated by the status flag between the first status and the second status in response to each generation of the second signal.

In one example embodiment of the computer input device, the communication device may be configured so that it does not transmit any signal to the processor in response to generation of the first signal conditional upon the status flag indicating the second status.

In one example embodiment of the computer input device, the computer input device may be configured to toggle the status indicated by the status flag between the first status and the second status in response to each generation of the second signal.

In one example embodiment of the computer input device, the computer input device may be configured so that, in response to the generation of the second signal, the computer input device changes the status indicated by the status flag between the first status, the second status, and a third status. The communication element may be configured to transmit to the processor, conditional upon the status flag indicating the second status, a third signal in response to the generation of the first signal for instructing the processor to move the graphical object in a direction corresponding to a reverse direction of the movement indicated by the first signal. The communication element may be configured so that it does not transmit any signal to the processor in response to generation of the first signal conditional upon the status flag indicating the third status.

In one example embodiment of the computer input device, the computer input device may further include a communication element configured to transmit the first signal to the processor in response to the generation of the first signal and to transmit the second signal to the processor in response to generation of the second signal for instructing the processor to change a status indicated by a status flag with which the processor is in communication and according to which the processor interprets the first signal.

In one example embodiment of the computer input device, the computer input device may be a computer mouse.

According to an example embodiment of the present invention, a method for causing movement of graphical object in a single direction may provide for moving a computer input device in a first direction, the computer input device being in communication with a processor that controls movement of the graphical object on a display in response to signals received from the computer input device identifying a type of movement of the computer input device; after the moving of the computer input device in the first direction, operating an input element integrated with the computer input device; and after the operation of the input element, moving the computer input device in a second direction that is opposite the first direction.

In one example embodiment of the method, the movement of the computer input device in the first direction prior to the operation of the input element and the movement of the computer input device in the second direction after the operation of the input element may cause the movement of the graphical object in the single direction on the display.

According to an example embodiment of the present invention, a computer system may provide a display device, a processor configured to control movement of a graphical object in the display device, and an input device. The input device may include a sensor configured to sense movement of the input device and generate a first signal indicating the sensed movement, and an input element configured to generate a second signal when operated. The input device may be configured to transmit to the processor at least the first signal for instructing the processor to move the graphical object in a direction corresponding to a direction of the movement indicated by the first signal. In response to the generation of the second signal, (a) responsiveness to the first signal by the processor may be inhibited or (b) correspondence of movement of the graphical object to the movement indicated by the first signal may be reversed.

In one example embodiment of the computer system, the system may further provide a memory device storing a first status flag. The processor may be configured to receive user input indicating to provide functionality to the system for causing the responsiveness to the first signal by the processor to be inhibited or the correspondence of movement of the graphical object to the movement indicated by the first signal to be reversed in response to the generation of the second signal. The processor may be configured to, responsive to the user input, set a status indicated by the first status flag for indicating that the functionality is to be provided. The processor may be further configured to respond to the generation of the second signal in accordance with the first status flag.

In one example embodiment of the computer system, the user input may identify which of the responsiveness to the first signal by the processor to be inhibited and the correspondence of movement of the graphical object to the movement indicated by the first signal to be reversed is to be caused in response to the generation of the second signal.

In one example embodiment of the computer system, the memory may include a second status flag, and the processor may be configured to change a status of the second status flag between a first status and a second status in response to receipt of the second signal.

In one example embodiment of the computer system, the processor may be configured to toggle the status of the second status flag between the first status and the second status in response to each receipt of the second signal.

In one example embodiment of the computer system, the processor is configured to identify the input device and determine whether the functionality for causing the responsiveness to the first signal by the processor to be inhibited or the correspondence of movement of the graphical object to the movement indicated by the first signal to be reversed is applicable to the input device.

In one example embodiment of the computer system, the processor may be configured to receive user input indicating to provide functionality to the system for causing the responsiveness to the first signal by the processor to be inhibited or the correspondence of movement of the graphical object to the movement indicated by the first signal to be reversed in response to the generation of the second signal. The processor may be configured to, responsive to the user input, transmit a third signal to the input device. The input device may include a memory device storing a first status flag. The input device may be configured to, in response to the third signal, change a status indicated by the first status flag from a first status corresponding to a disablement of the functionality for causing the responsiveness to the first signal by the processor to be inhibited or the correspondence of movement of the graphical object to the movement indicated by the first signal to be reversed to a second status corresponding to an enablement of the functionality for causing the responsiveness to the first signal by the processor to be inhibited or the correspondence of movement of the graphical object to the movement indicated by the first signal to be reversed. The input device may be further configured to, in response to the generation of the second signal and conditional upon the first status flag being set to the second status, omit transmitting the first signal to the processor or transmit a fourth signal to the processor, the fourth signal instructing the processor to move the graphical object in a direction corresponding to an opposite of the direction of the movement indicated by the first signal.

In one example embodiment of the computer system, the input element may be a toggle button.

In one example embodiment of the computer system, the input device may be configured for the input element to be moved into three positions. When the input element is in a first one of the positions, the processor may respond to the movement of the input device by moving the graphical object in the direction corresponding to the direction of the movement indicated by the first signal. The computer system may provide that when the input element is in a second one of the positions, the processor does not move the graphical object in response to the movement of the input device. The computer system may further provide that when the input element is in a third of the positions, the processor may respond to the movement of the input device by moving the graphical object in a direction that is opposite to the direction corresponding to the direction of the movement indicated by the first signal.

DETAILED DESCRIPTION

Figure 1:
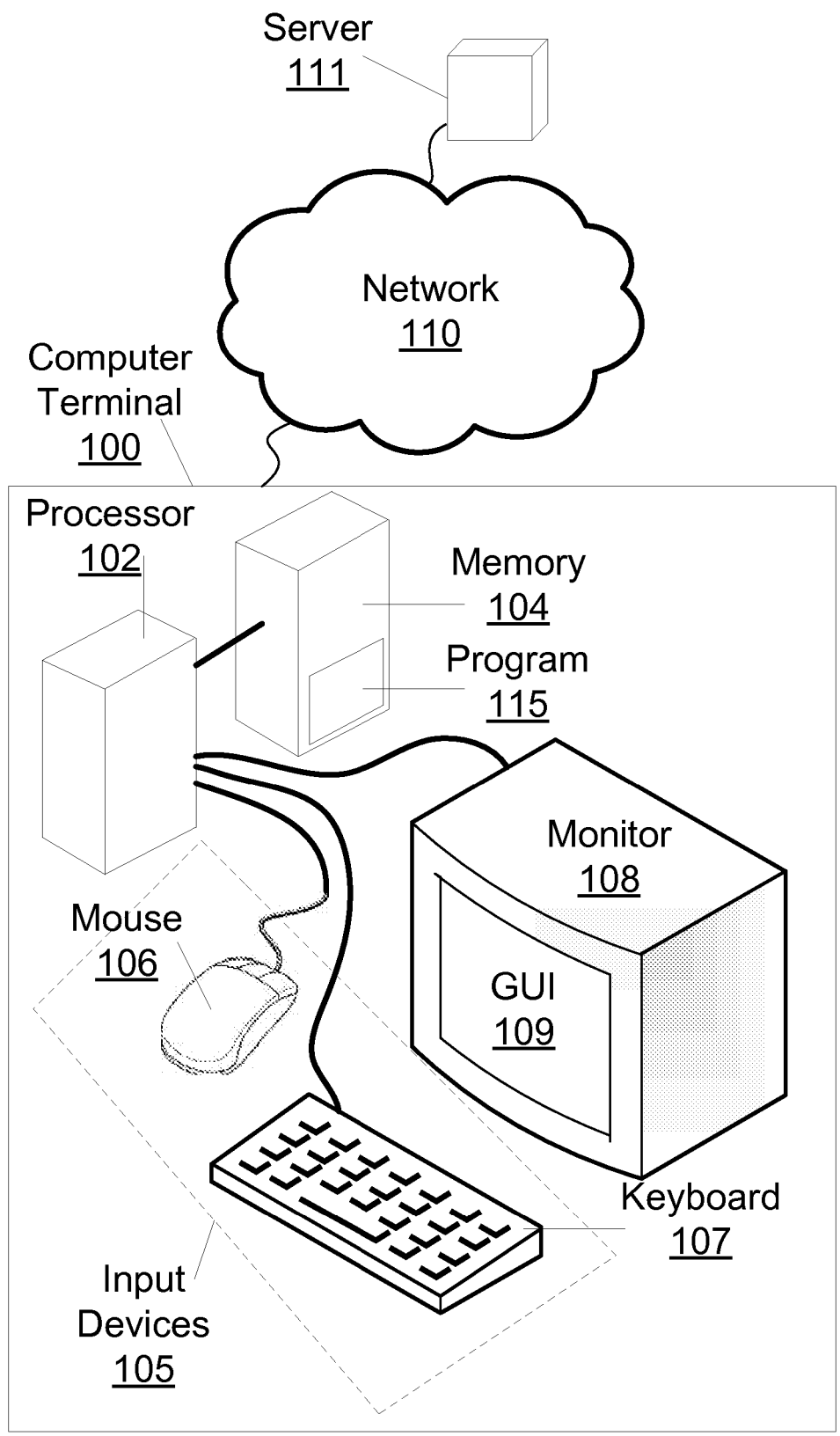
FIG. 1 is a block diagram that illustrates components of a system according to an example embodiment of the present invention.

FIG. 1 shows a system according to an example embodiment of the present invention. The system 1 may include a computer terminal 100 at which there may be located a computer processor 102 for processing computer program instructions stored in a memory 104 and for processing input received, e.g., from one or more input devices 105 or received over a network 110, e.g., the Internet. The computer program may be written in any suitably appropriate computer language or combination of computer languages. Example computer languages that may be used to implement the computer system and method of the present invention may be Java, Extensible Markup Language (XML), C++, or a combination thereof. However, this is a non-exhaustive list.

The processor 102 may be any one or combination of suitably appropriate processing systems, such as, for example, a microprocessor, a digital signal processor, and/or a field programmable logic array. The processing system may be embodied as any suitably appropriate computing device, e.g., a computer, personal digital assistant (PDA), laptop computer, notebook computer, a hard-drive based device, or any device that can receive, send, and store data. The processor 102 may be present locally at the computer terminal 100. Alternatively, the processor 102 or parts thereof may be remotely located. For example, processing may be shared with a processor located remotely at a server 111, e.g., operated by an entity other than the user of the computer terminal 100.

The memory 104 may include any combination of conventional memory circuits, including electrical, magnetic, and/or optical systems. The memory 104 may include, for example, read only memory (ROM), random access memory (RAM), a hard disk, transportable storage media, such as a CD, DVD, and/or floppy disk, or other bulk memory. The memory 104 may include any suitably appropriate memory device for storing program instructions, storing temporary storage, caching, and/or buffering data items.

The processing may include displaying one or more files and/or one or more graphical interface objects. The input devices 105 may include, e.g., a keyboard 107, a pointing device such as a mouse 106, and/or any other suitably appropriate input device.

The system 1 may include a monitor 108 via which the processor 102 may display a graphical user interface (GUI) 109. In the GUI 109, the processor 102 may display a graphical object, the position of which may be controlled by the processor 102 in accordance with user input received via an input device 105, and in particular, via the mouse 106. The graphical object may be any suitable appropriate object. For example, a non-exclusive list of graphical objects includes a cursor, an arrow, and/or slide bar. The memory 104 may have stored therein a computer program 115 executed by the processor 102 for interpretation of input received via the mouse 104.

The mouse 106 may include a roller at its bottom, which may be moved by moving the mouse 106. Movement of the roller may cause signals to be input to the processor 102. Alternatively, the mouse 106 may include any suitably appropriate sensor such as an infrared (IR) sensor, e.g., at its bottom, that senses movement of the mouse 106 and that transmits signals to the processor 102. The signals may be sent through a wire or wirelessly. The processor 102 may interpret the received signals, e.g., by execution of the program 115. In response to received signals that indicate movement of the mouse 106 in a direction, the processor 102 may correspondingly move a displayed graphical interface object in a corresponding direction on the monitor 108. The corresponding direction may be the direction of movement with respect to the display area of the monitor 108 that would be the same as the direction of movement of the mouse 106 if (a) the plane of the surface of the monitor 108 would be translated to be parallel to the surface (assuming not already parallel) on which the mouse 106 rests and (b) the monitor 108 would be rotated so a direction passing from its lower end to its upper end (e.g., upper with respect to an orientation of objects displayed on the monitor 108) is the same direction as a direction passing from the mouse 106's tail end toward its forward end. The mouse 106's forward end may be that end towards which users intuitively move the mouse 106 in order to cause movement of a graphical object in the monitor 108 towards the monitor 108's upper end.

The particular graphical object that is moved may depend on a context in which the mouse 106 is moved. For example, if, when the mouse is moved, the object is displayed in a position that overlays a document displayed in a word processor environment, the object may be a cursor. If, when the mouse is moved, the object is displayed in a position that overlays a menu bar or other root window position, e.g., a desktop, the object may be an arrow. If, when the mouse is moved, the object is displayed in a position that overlays a scrolling track, the object may be an arrow and/or a slide bar.

Figure 2:
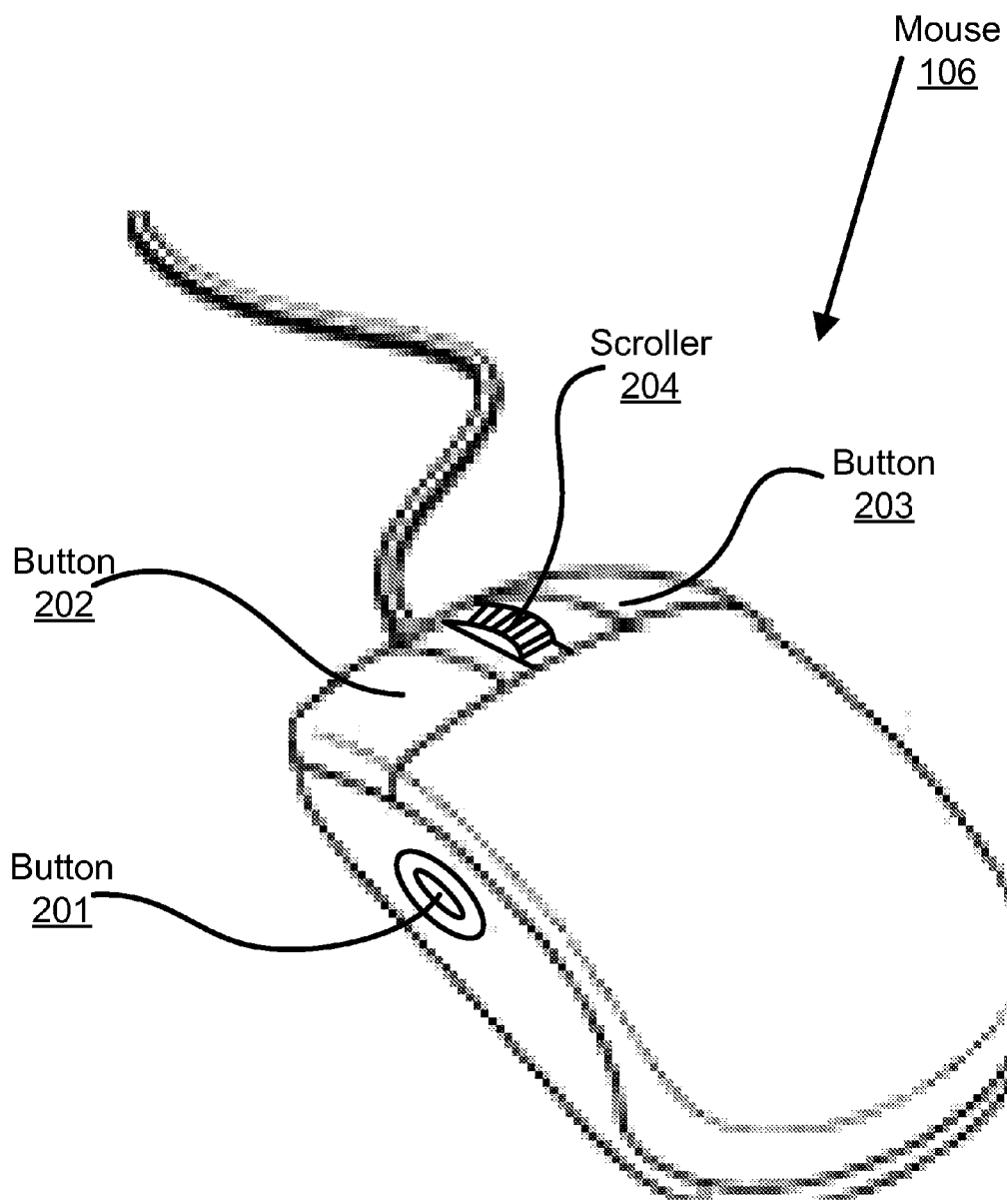
FIG. 2 shows a mouse having a button according to an example embodiment of the present invention.

The mouse 106 may include elements provided for user manipulation to input data other than via movement of the mouse 106 as a whole. FIG. 2 shows a mouse 106 according to an example embodiment of the present invention. The mouse 106 may include buttons 201, 202, and 203, and may include a scroller 204. In alternative embodiments, one or more of the buttons and/or the scroller may be omitted. The button 202 may be used, e.g., to select an object for dragging and dropping to a new location, the location determined by the movement of the mouse 106 as a whole. For example, the user may move the mouse 106 so that a displayed arrow is moved over a slide bar. While the arrow is overlaid on the slide bar, the user may push the button 202 to select the slide bar. While the slide bar is so selected, the user may move the mouse 106. The processor 102 may then move the slide bar in a direction that corresponds to a direction in which the user moved the mouse 106. The button 203 may be used, e.g., as a "right click" to cause display of an options menu where applicable. Other functions may be assigned to the buttons 202 and 203 and various functions may be implemented automatically according to context. The scroller 204 may be used to move an object, e.g., a document or slide bar, up and/or down corresponding to motion of the scroller 204.

Figure 3:
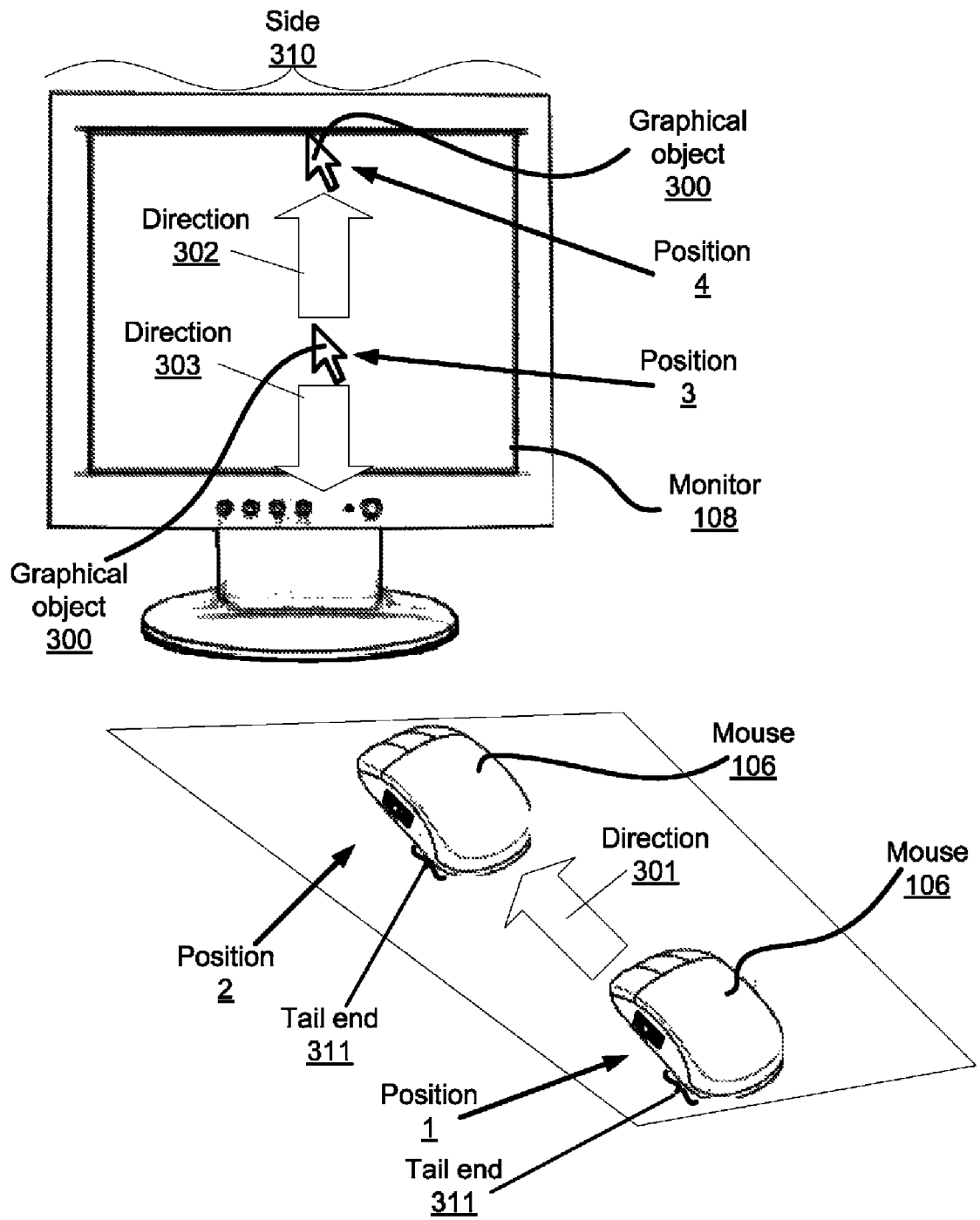
FIG. 3 is a diagram that shows corresponding movement between a mouse and a graphical object according to an example embodiment of the present invention.

The button 201 may be used to effectively extend the stroke of the computer mouse 106 for corresponding movement of a graphical object on the GUI 109 in a particular direction. In one example embodiment, in response to a signal received from the mouse 106 indicating that the button 201 has been pressed, the processor 102, e.g., by execution of the program 115, may reverse the correspondence of the direction of movement of the graphical object to the direction of the movement of the mouse 106. For example, movement of the graphical object based on the movement of the mouse 106 may be as shown in FIG. 3 when the button 106 is pressed. FIG. 3 shows movement of the mouse 106 from a first position "position 1" to a second position "position 2" in a direction 301, and shows corresponding movement of a graphical object 300 from a first position "position 3" to a second position "position 4" in a direction 302. The corresponding movement of the graphical object 300 in direction 302 is the non-intuitively expected directional movement, since side 310 of the display area of the monitor 108 is the upper end of the display area and the end 311 of the mouse 106 is the tail end of the mouse 106. When the button 201 is not pressed (or is otherwise in a different state as set forth in detail below), the graphical object 300 may be moved by the processor 102 in an opposite direction 303, i.e., the intuitive direction, in response to movement of the mouse 106 in the direction 301. Although each of the intuitive and non-intuitive directions were described as being caused respectively by not pressing and pressing the button 201, the respective relationships may be reversed.

In an alternative example embodiment of the present invention, in response to a signal indicating that button 201 has been pressed (or vice versa), the processor 102 may ignore input from the mouse 106 indicating directional movement of the mouse 106. For example, if the button 201 is pressed and the user moves the mouse 106 in direction 301, the processor 102 may leave the graphical object 300 in the position at which it was displayed prior to movement of the mouse 106, i.e., the mouse 106 may be disabled at least with respect to directional movement of the graphical object 300 corresponding to directional movement of the mouse 106.

In an example embodiment of the present invention, in response to a signal received indicating that the button 201 has been operated, the processor 102 may set a flag, e.g., in the memory 104, to a corresponding value. For example, the flag may be a bit set to 0 by default. In response to operation of the button 201, the flag may be set to 1, until another operation of the button 201 indicates that the flag should be reset to the default value. (Examples of particular operations that may indicate when to reset the default functionality are discussed below.) (The flag may require more than one bit, for example, where more than one option regarding the mouse functionality is provided to the user, as discussed below.)

In an example embodiment of the present invention, instead of the processor 102 setting a flag stored in the memory 104, the mouse 106 itself may maintain a flag for indicating the type of signal to transmit to the processor 102. For example, according to this embodiment, if the mouse 106 is moved in a direction when the locally maintained flag is set to a first value, the mouse 106 may transmit a signal indicating movement of the mouse 106 in the direction. If the mouse 106 is moved in the direction when the locally maintained flag is set to a second value, the mouse 106 may transmit a signal indicating movement of the mouse 106 in a direction opposite to the one in which the mouse 106 was actually moved, or may otherwise refrain from transmitting the signal indicating the movement of the mouse 106, depending on the particular one of the embodiments discussed above.

In one example embodiment of the present invention, although the mouse 106 may be disabled with respect to directional movement of the graphical object 300 corresponding to directional movement of the mouse 106, the mouse 106 may be enabled with respect to other input elements of the mouse 106. For example, with respect to a "left click" and a "right click" of buttons 202 and 203, the mouse 106 may remain enabled. For example, the user may input a left click via the button 202 to select a slide bar. While the slide bar is selected, the user may move the mouse 106 in a particular direction to move the slide bar in a corresponding direction. The user may then select button 201 to disable the mouse 106 with respect to the responsiveness to the directional movement of the mouse 106, but may continue to maintain the button 202 in a pressed position, so that the slide bar remains selected. The user may then operate button 201 to re-enable the mouse 106 with respect to responsiveness to the directional movement of the mouse 106, e.g., after movement of the mouse 106 in a direction opposite to the particular direction, and continue to move the mouse 106 in the particular direction to continue to correspondingly move the still selected slide bar. In an alternative embodiment of the present invention, upon selection of the button 201, the processor 102 may maintain the state of affairs caused by the state of the buttons 202, 203, and/or any other button or input element of the mouse 106, e.g., aside from button 201, as they were indicated at the time of selection of the button 201. Accordingly, if the slide bar is selected when the button 201 is selected, the slide bar may remain selected even if the user releases button 202, until operation of button 201 to re-enable the mouse 106 with respect to responsiveness to the directional movement of the mouse 106 (or until a time slight thereafter, e.g., to give the user a chance to re-press the button 202 to maintain the slide bar in the selected state).

In one example embodiment of the present invention, whether pressing the button 201 causes reversal of the correspondence of the directional movement of the graphical object to the directional movement of the mouse or otherwise causes disablement of the causal relationship of directional movement of the mouse to directional movement of the graphical object may be provided as an option to the user. For example, the processor 102 may provide an interface screen with data entry fields, such as drop-down boxes or radio buttons, into which the user may input the user's preference. In yet another embodiment, more than one button 201 may be provided, such that one of the buttons 201 is provided for causing reversal of the correspondence of the directional movement of the graphical object to the directional movement of the mouse and another of the buttons 201 is provided for causing disablement of the causal relationship of directional movement of the mouse to directional movement of the graphical object. In yet another alternative embodiment, the button 201 may be configured to be moved into a plurality of positions for the different states, as discussed below.

The button 201 may be positioned anywhere on the mouse 106. However, to allow the user to easily control the button 201 in mid-stroke of the mouse 106, e.g., during manipulation of the displayed graphical object, the button 201 may be positioned on a side of the mouse that extends perpendicular to the surface on which the mouse 106 rests when the mouse 106 is in position for causing corresponding movement of the displayed graphical object by movement of the mouse 106 against the surface. In particular, for the easy control, the button 201 may be positioned at a forward half of the side, where the forward half is the half of the mouse 106 including the forward end of the mouse 106. For example, where the mouse 106 is positioned so that it rests on a surface having a plane that extends perpendicular to a plane that extends parallel to a user's back, the forward end of the mouse 106 may be the end furthest away from the user when the mouse 106 is positioned for corresponding intuitive movement of the displayed graphical object.

In one example embodiment of the present invention, the mouse 106 may be configured to be in a default state so long as the user keeps the button 201 pressed, and to be in the state of causing reversed or inhibited corresponding graphical object movement when the button 201 is in a released position. In yet another alternative embodiment, whichever state the mouse 106 is in may remain until the user releases the button 201 and presses it again. These embodiments may be implemented since it may be more comfortable for the user to apply pressure to the side of the mouse 106, and therefore to the button 201, than to relax the user's thumb where the button 201 is in a released position. In one variant, which of the above described embodiments is to be implemented may be provided as another user selectable option, e.g., according to the methods of providing user-selectable options described above.

In one example embodiment, two buttons 201 may be provided, each on an opposite side of the mouse 106. This may be useful to accommodate both left and right handed users, so that a right handed user may operate the button 201 on the left side of the mouse 106 with the right handed user's thumb and so that a left handed user may operate the button 201 on the right side of the mouse 106 with the left handed user's thumb.

In one example embodiment, the effect of pressing the button 201 may remain until the button 201 is released. In an alternative example embodiment, the effect of pressing the button 201 may remain even after release of the button 201 until the button 201 is pressed again. In one example embodiment, which of these should be the case may be provided to the user as a selectable option, e.g., provided to the user as discussed above with respect to other possibly provided options. In one example embodiment of the present invention, two buttons 201 may be provided. A first one of the buttons 201 may reverse or disable the default directional correspondence between movement of the graphical object 300 and movement of the mouse 106; a second one of the buttons 201 may restore the default functionality.

Figure 6:
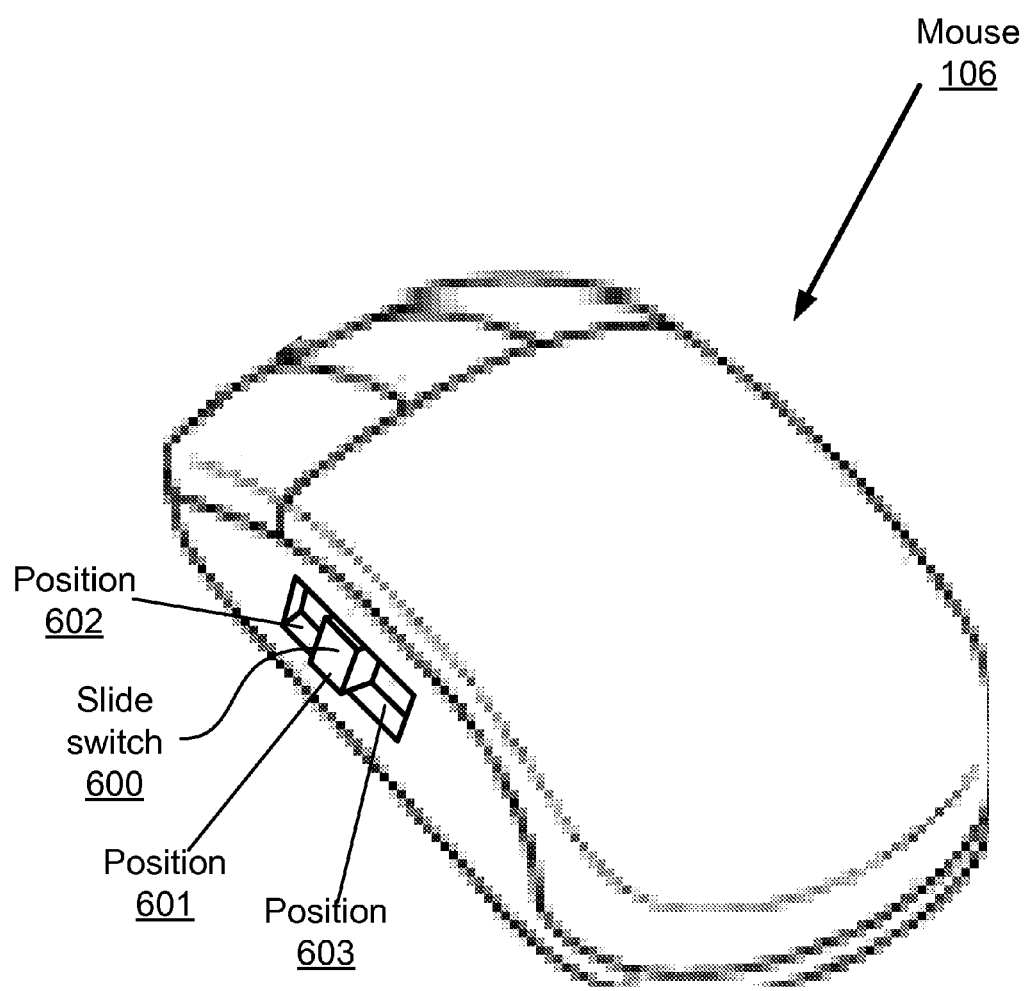
FIG. 6 shows a mouse having a slide switch according to an example embodiment of the present invention.
Figure 7:
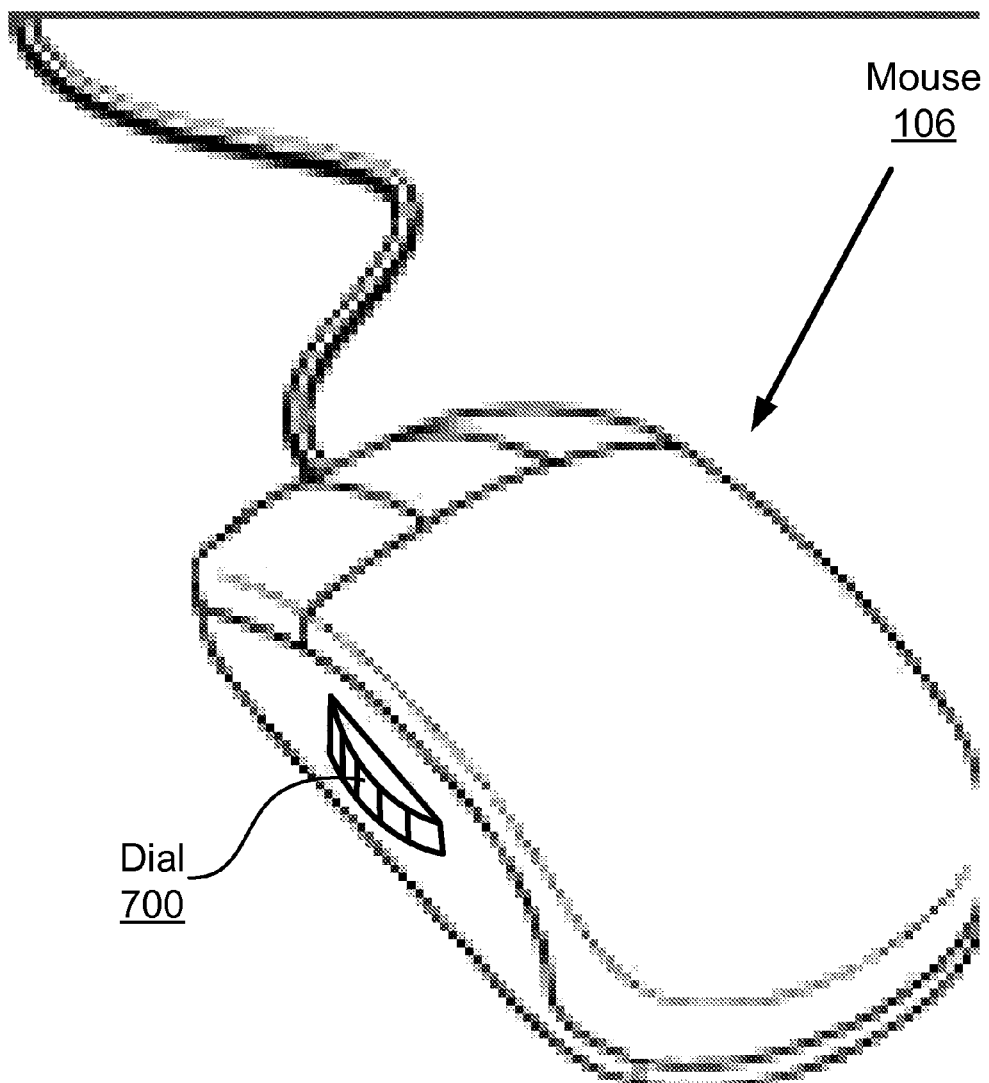
FIG. 7 shows a mouse having a dial according to an example embodiment of the present invention.

Instead of the button(s) 201, other switch-like input elements, such as slide or rocker switches, may be provided. However, push-buttons may be easiest to manipulate while controlling directional movement of the mouse 106. Nevertheless, a slide switch requiring a certain amount of effort that may help prevent unintentional operation of button 201 may be used. FIG. 6 shows the mouse 106 having a slide switch 600 as the button 201, according to an example embodiment of the present invention. In one variant, the slide switch 600 may be configured for moving into any of three positions, shown in FIG. 6 as positions 601, 602, and 603. When the switch 600 is in one of the positions, a first correspondence of the directional movement of the graphical object to the directional movement of the mouse may be implemented. When the switch 600 is slid into a second of the positions, reversal of the first correspondence of the directional movement of the graphical object to the directional movement of the mouse may be implemented. When the switch 600 is slid into a third of the positions, causal relationship of directional movement of the mouse to directional movement of the graphical object may be disabled. In yet another embodiment of the present invention, the button 201 may be provided as a dial, as shown in FIG. 7. For example, the dial 700 of FIG. 7 may have two or more stop positions corresponding to different ones of the states described with respect to button 201.

In an example embodiment of the present invention, the button(s) 201 may initially be provided without functionality for reversing or disabling correspondence of directional movement of a graphical object to directional movement of the mouse 106. For example, the button(s) 201 may initially have some other functionality or may have no functionality. According to this embodiment, a selectable option, e.g., including the sub-options discussed above, may be provided to the user, e.g., according to the same or different option selection methods discussed above, for indicating whether to impart to the button(s) 201 the functionality for reversing or disabling correspondence of directional movement of a graphical object to directional movement of the mouse 106. In one variant of this embodiment, the system and method of the present invention may provide the user with an option to select which button on the mouse 106 to impart the functionality. For example, the memory 104 may include data identifying features, including a plurality of buttons, of one or more types of computer pointing devices, e.g., a plurality of types of computer mice. The system and method may use the stored feature descriptions for receiving the user input to select the particular button(s) to which to impart the functionality. For example, a drop down list including list items, each list item being a respective feature description, may be provided to the user for selection.

In an embodiment according to which data regarding more than one type of computer pointing device to which the system is adapted to impart the functionality is included in the memory 104, the system and method of the present invention may provide for receiving input from the user indicating to which particular pointing device to impart the functionality, or may otherwise automatically recognize which particular pointing device is in communication with the processor 102 and automatically select the recognized device as the one to which to impart the functionality.

In an example embodiment of the present invention, the functionality for reversing or disabling correspondence of directional movement of a graphical object to directional movement of the mouse 106 may be imparted to the mouse 106 on an application and/or application suite specific basis. For example, the functionality may be more pertinent to particular applications than to other applications. For example, continuous movement of a graphical object in a single direction might be more often performed by a user with respect to an Internet browser to peruse a website than with respect to working with a document in a word processor. According to this embodiment, after setting the functionality of the mouse 106 in a particular application's environment, the button(s) 201 of the mouse 106 may include the functionality as long as the user is working within that environment. If the user leaves that application's environment, for example, by minimizing the application's window or by working within, and thereby setting as more dominant, another window of another application environment, the functionality may be removed (though the option to set the functionality with respect to the second application environment may be provided). In one variant of this embodiment, if the user returns to the application environment in which the functionality was set, the functionality may be returned. In an alternative variant of this embodiment, it may be required for the user to reset the functionality. In yet another variant, whether or not resetting of the functionality is required may be a selectable option. Furthermore, in a variant of this embodiment, even within a single application environment, the functionality may be limited to particular portions thereof. For example, the functionality may be imparted to the mouse 106 with respect to one window of an Internet browser, but not another window of the same Internet browser. In another variant, whether the extent to which functionality is to be imparted to the mouse 106 with respect to various portions of an application environment may be set by the user.

Figure 4:
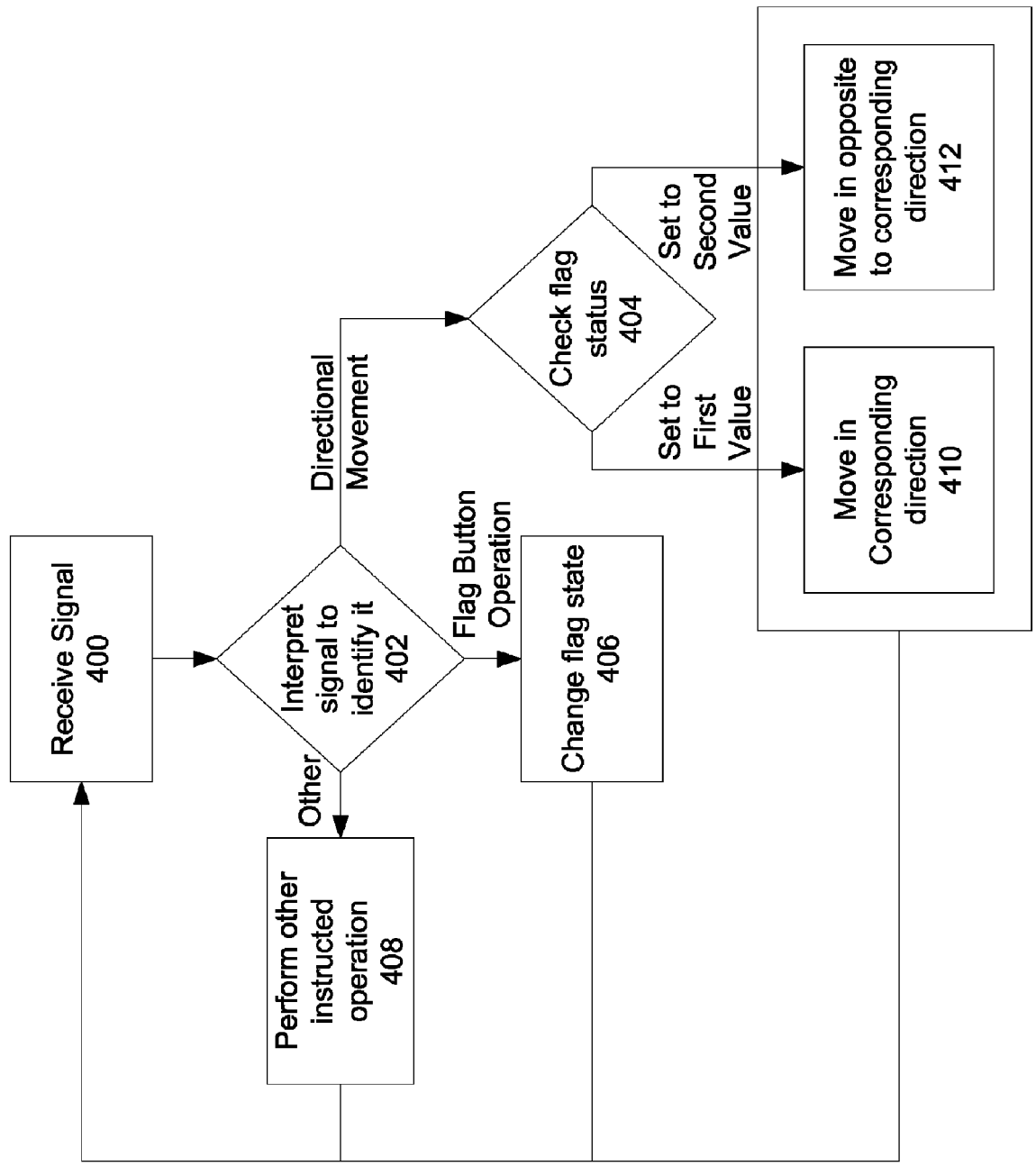
FIG. 4 is a flowchart that illustrates methods that may be performed for interpreting signals of a mouse to correspondingly move a graphical object according to an example embodiment of the present invention.

FIG. 4 is a flowchart that illustrates a method that may be performed for moving a graphical object within a display area based on movement of a mouse, according to an example embodiment of the present invention. At 400, a processor may receive a signal from the mouse. At 402, the processor may interpret the received signal to identify it as one of a plurality of signals that the mouse is configured to transmit to the processor or that the processor is configured to receive from mice.

If the received signal is identified as identifying a directional movement of the mouse, a status of a flag that may be set to different values, each value indicating a different way to respond to identification of directional movement of the mouse, may be checked at 404. If the flag is set to a first value, the processor may, at 410, reposition a graphical object by moving it in a first direction representing the direction of movement indicated by the received signal. If the flag is set to a second value, the processor may, at 412, reposition the graphical object by moving it in a second direction opposite to the first direction. In an alternative embodiment, if the flag is set to a second value, the processor may instead refrain from further responding to the received signal after 404. Subsequent to performance of 410 or 412 (or 404), the processor may wait for another received signal at 400.

If the received signal is identified as identifying operation of a flag setting button, the processor may, at 406, change the flag status. Subsequent to performance of 406, the processor may wait for another received signal at 400.

If the received signal is identified as identifying some other operation representing an instruction to the processor to perform an operation other than that performed in 406 and 404-412, the processor may at 408 perform the instructed operation. Subsequent to performance of 408, the processor may wait for another received signal at 400.

In an alternative example embodiment, the mouse itself may receive the signal at 400, interpret the signal at 402, change a local flag state at 406 where appropriate, transmit the perform other instructed operation signal to the processor at 408, check the flag status at 404, and transmit (or refrain from transmitting) the directional movement signal to the processor according to the flag status at 410-412. For example, if the flag status is set to the first value, the mouse may transmit, at 410, a signal indicating movement in a first direction; if the flag status is set to the second value, the mouse may transmit, at 412, a signal indicating movement in a second direction opposite to the first direction. Alternatively, if the flag status is set to the second value, the mouse may refrain from transmitting a signal to the processor in response to the directional movement of the mouse and may return to waiting for another user input at 400.

Figure 5:
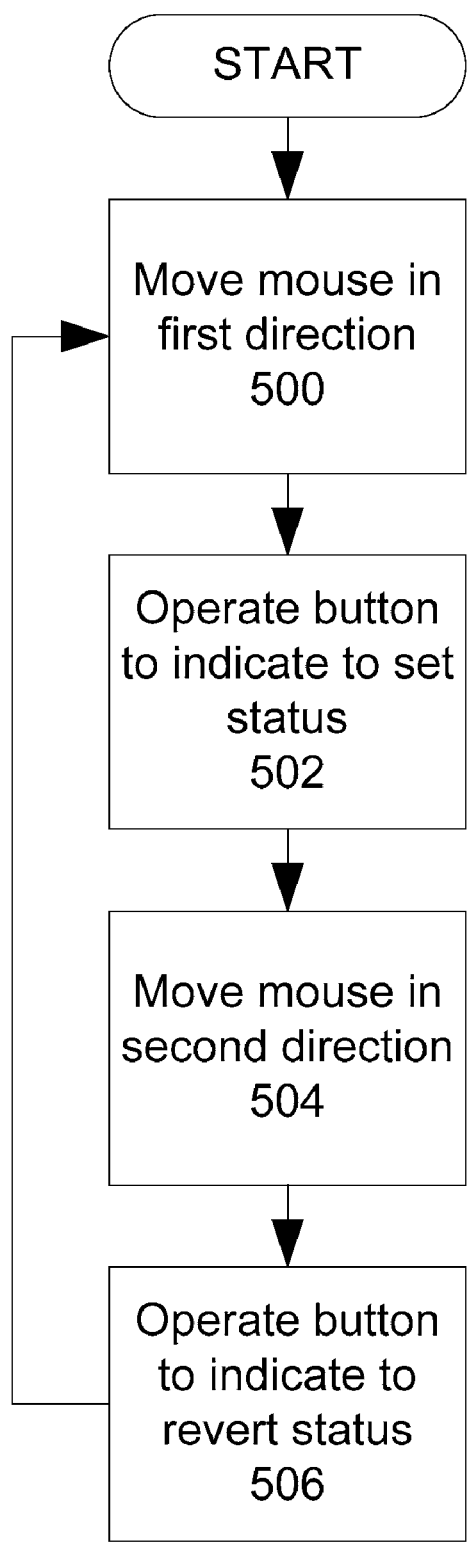
FIG. 5 is a flowchart that illustrates a method for a user to operate a mouse to cause movement of a graphical object according to an example embodiment of the present invention.

FIG. 5 is a flowchart that illustrates a method that may be performed for moving a graphical object within a display area in a single direction based on movement of a mouse, according to an example embodiment of the present invention. At 500, a user may move a mouse in a first direction. At 502, the user may operate a button for indicating to set a status to either ignore mouse movement or to treat mouse movement as though occurring in a direction opposite to an actual movement of the mouse for corresponding movement of the graphical object. While the status is set, the user may, at 504, move the mouse in a second direction opposite the first direction. At 506, the user may operate the previously operated button for indicating to change the status back to treating the mouse movement as a movement as occurring in its actually moved direction for corresponding movement of the graphical object. The user may then return to 500.

Those skilled in the art can appreciate from the foregoing description that the present invention can be implemented in a variety of forms. Therefore, while the embodiments of this invention have been described in connection with particular examples thereof, the true scope of the embodiments of the invention should not be so limited since other modifications will become apparent to the skilled practitioner upon a study of the drawings, specification, and following claims.

What is claimed is:

1. A computer input device, comprising:
  a sensor configured to sense movement of the input device and, for each sensed movement, generate a respective first signal indicating the respective sensed movement; and
  an input element configured to generate a second signal when operated;
  wherein:
    the computer input device is adapted for transmitting to a processor data for instructing the processor to move a graphical object in a direction corresponding to a direction of the movement indicated by the respective first signal;
    in response to the generation of the second signal, correspondence of movement of the graphical object to the movement indicated by the first signal is reversed, such that, in response to subsequent sensed movement of the device, the processor moves the graphical object in a direction that is opposite to a direction that corresponds to the subsequent sensed movement;
    the input device is a computer mouse; and
    the input element is a button positioned on a side of the mouse that extends perpendicular to a surface on which the mouse rests when the mouse is in position for causing the movement of the graphical object in the direction corresponding to the direction of the movement indicated by the first signal, at a front half of the mouse.

2. The computer input device of claim 1, wherein:
  the operation of the input element for causing the generating of the second signal is by releasing the button.

3. The computer input device of claim 1, further comprising:
  a memory device configured to store a status flag; and
  a communication element configured to transmit signals generated by the computer input device to the processor;
  wherein:
    in response to the generation of the second signal, the computer input device is configured to change a status indicated by the status flag between at least a first status and a second status; and
    the communication element is configured to transmit to the processor, conditional upon the status flag indicating the second status, a third signal in response to the generation of the first signal for instructing the processor to move the graphical object in a direction corresponding to a reverse direction of the movement indicated by the first signal.

4. The computer input device of claim 3, wherein the computer input device is configured to toggle the status indicated by the status flag between the first status and the second status in response to each generation of the second signal.

5. The computer input device of claim 3, wherein:
  in response to the generation of the second signal, the computer input device is configured to change the status indicated by the status flag between the first status, the second status, and a third status; and the communication element does not transmit any signal to the processor in response to generation of the first signal conditional upon the status flag indicating the third status.

6. The computer input device of claim 5, wherein:
the input device includes a button, in response to activation of which, a displayed component is selectable; and
the system is configured such that, where the input element is manipulated to cause the status flag to be changed to indicate the third status while the displayed component is selected by activation of the button, the component remains selected even after de-activation of the button until the status flag changes again.

7. The computer input device of claim 1, further comprising:
a communication element configured to:
transmit the first signal to the processor in response to the generation of the first signal; and
transmit the second signal to the processor in response to generation of the second signal for instructing the processor to change a status indicated by a status flag with which the processor is in communication and according to which the processor interprets a directionality indicated by the first signal.

8. The computer input device of claim 3, wherein the computer input device is a computer mouse and the processor is part of a computer to which the computer mouse is connected.

9. A method for causing movement of graphical object in a single direction, comprising:
moving a computer input device in a first direction with respect to a surface, the computer input device being in close enough proximity to the surface for generation of signals identifying a type of movement of the computer input device with respect to the surface and being in communication with a processor that controls movement of the graphical object on a display in response to the signals;
after the moving of the computer input device in the first direction, operating an input element integrated with the computer input device; and
after the operation of the input element and while maintaining the computer input device in the close enough proximity to the surface, moving the computer input device in a second direction that is opposite the first direction, the processor moving the graphical object in the single direction responsive to the directionality of movement of the computer input device in the second direction.

10. The method of claim 9, wherein each of the movement of the computer input device in the first direction prior to the operation of the input element and the movement of the computer input device in the second direction after the operation of the input element causes the movement of the graphical object in the single direction on the display.

11. A computer system, comprising:
a display device;
a processor configured to control movement of a graphical object in the display device; and
an input device comprising:
a sensor configured to sense movement of the input device and, for each sensed movement, generate a respective first signal indicating the respective sensed movement; and
an input element configured to generate a second signal when operated;

wherein:
the input device is configured to transmit to the processor data for instructing the processor to move the graphical object in a direction corresponding to a direction of the movement indicated by the respective first signal;
in response to the generation of the second signal, correspondence of movement of the graphical object to the movement indicated by the first signal is reversed, such that, in response to subsequent sensed movement of the device, the processor moves the graphical object in a direction that is opposite to a direction that corresponds to the subsequent sensed movement;
the input device is a computer mouse; and
the input element is a button positioned on a side of the mouse that extends perpendicular to a surface on which the mouse rests when the mouse is in position for causing the movement of the graphical object in the direction corresponding to the direction of the movement indicated by the first signal, at a front half of the mouse.

12. The computer system of claim 11, further comprising:
a memory device storing a first status flag;
wherein the processor is configured to:
receive user input indicating to provide functionality to the system for causing the reversal in response to the generation of the second signal;
responsive to the user input, set a status indicated by the first status flag for indicating that the functionality is to be provided; and
respond to the generation of the second signal in accordance with the first status flag.

13. The computer system of claim 12, wherein the user input identifies which of (a) the reversal and (b) an inhibition of responsiveness to the first signal is to be caused in response to the generation of the second signal.

14. The computer system of claim 12, wherein:
the memory includes a second status flag; and
the processor is configured to change a status of the second status flag between a first status and a second status in response to receipt of the second signal.

15. The computer system of claim 14, wherein the processor is configured to toggle the status of the second status flag between the first status and the second status in response to each receipt of the second signal.

16. The computer system of claim 12, wherein the processor is configured to identify the input device and determine whether the functionality for causing the reversal is applicable to the input device.

17. The computer system of claim 11, wherein:
the processor is configured to:
receive user input indicating to provide functionality to the system for causing the reversal in response to the generation of the second signal; and
responsive to the user input, transmit a third signal to the input device; and
the input device:
includes a memory device storing a first status flag;
is configured to, in response to the third signal, change a status indicated by the first status flag from a first status corresponding to a disablement of the functionality for causing the reversal to a second status corresponding to an enablement of the functionality for causing the reversal; and
is configured to, in response to the generation of the second signal and conditional upon the first status flag being set to the second status, transmit a fourth signal to the processor, the fourth signal instructing the processor to move the graphical object in a direction corresponding to an opposite of the direction of the movement indicated by the first signal.

18. The computer system of claim 11, wherein the input element is a toggle button.

19. The computer system of claim 11, wherein:

the input device is configured for the input element to be moved into three positions;

when the input element is in a first one of the positions, the processor responds to the movement of the input device by moving the graphical object in the direction corresponding to the direction of the movement indicated by the first signal;

when the input element is in a second one of the positions, the processor does not move the graphical object in response to the movement of the input device; and when the input element is in a third of the positions, the processor responds to the movement of the input device by moving the graphical object in a direction that is opposite to the direction corresponding to the direction of the movement indicated by the first signal.

* * * * *